US009441654B2

(12) United States Patent
Durfee, Jr.

(10) Patent No.: US 9,441,654 B2
(45) Date of Patent: Sep. 13, 2016

(54) PRECISION POSITIONING AND FASTENING SYSTEM

(71) Applicant: David L Durfee, Jr., Meadville, PA (US)

(72) Inventor: David L Durfee, Jr., Meadville, PA (US)

(73) Assignee: Modern Industries, Inc., Erie, PA (US)

( * ) Notice: Subject to any disclaimer, the term of this patent is extended or adjusted under 35 U.S.C. 154(b) by 30 days.

(21) Appl. No.: 14/294,223

(22) Filed: Jun. 3, 2014

(65) Prior Publication Data

US 2015/0345527 A1    Dec. 3, 2015

(51) Int. Cl.
| | | |
|---|---|---|
| *F16B 5/02* | (2006.01) | |
| *F16B 21/18* | (2006.01) | |
| *B23Q 3/06* | (2006.01) | |
| *F16B 19/02* | (2006.01) | |

(52) U.S. Cl.
CPC ............. *F16B 5/0208* (2013.01); *B23Q 3/069* (2013.01); *F16B 5/025* (2013.01); *F16B 5/02* (2013.01); *F16B 19/02* (2013.01); *F16B 21/183* (2013.01); *Y10T 29/49947* (2015.01); *Y10T 29/49948* (2015.01); *Y10T 29/50* (2015.01); *Y10T 403/1616* (2015.01); *Y10T 403/1624* (2015.01)

(58) Field of Classification Search
CPC ...... F16B 5/0208; F16B 21/183; F16B 5/02; F16B 5/025; F16B 19/02; Y10T 29/49947; Y10T 29/49948; Y10T 29/4978; Y10T 29/49782; Y10T 403/1616; Y10T 403/1624; B23Q 3/069
USPC ................ 29/525.01, 525.02, 407.1, 407.09; 411/107, 353, 999; 403/13, 14, 353; 248/220.31, 220.41, 221.11, 222.41; 296/46, 305, 902
See application file for complete search history.

(56) References Cited

U.S. PATENT DOCUMENTS

| | | | | |
|---|---|---|---|---|
| 3,041,913 A | * | 7/1962 | Liska | F16B 5/0208 285/148.27 |
| 3,263,549 A | * | 8/1966 | Jordan | B21D 37/04 29/256 |
| 3,812,895 A | * | 5/1974 | Smith | B21D 28/34 411/352 |
| 3,977,801 A | * | 8/1976 | Murphy | E04B 1/2403 248/188 |
| 3,986,318 A | * | 10/1976 | McConnell | F16B 12/34 211/192 |
| 4,017,267 A | * | 4/1977 | Hawley | B21D 28/14 29/407.1 |
| 4,630,811 A | * | 12/1986 | Rudisill | B23Q 3/103 269/118 |
| 4,828,240 A | * | 5/1989 | Longenecker | B23Q 3/103 269/100 |
| 5,139,361 A | * | 8/1992 | Camuffo | F16B 5/02 403/408.1 |
| 5,253,944 A | * | 10/1993 | Preston | B64G 1/646 244/173.3 |
| 5,788,225 A | * | 8/1998 | Iwata | B23Q 3/103 269/309 |
| 6,364,277 B1 | * | 4/2002 | Miller | B23Q 7/1431 248/676 |

(Continued)

*Primary Examiner* — Christopher Besler
*Assistant Examiner* — Bayan Salone
(74) *Attorney, Agent, or Firm* — Richard K Thomson (57) ABSTRACT

A locator/fastener has a first outer member with a precision-machined external body portion, a retention head protruding from a first end, and a multi-diameter throughbore. A fastener, which may take the form of a cap screw, floats in the throughbore of the locator with the threaded portion protruding from a second end of the locator. A receiver has an internal precision-machined surface which contacts the precision-machined body portion of the locator and a threaded bore which receives the protruding fastener. By separating the locating and fastening functions, a quick connect disconnect device is created which does not bind or gall. A hangar system allows a sub-base plate to be attached to a base using the locator-fastener disclosed herein.

3 Claims, 11 Drawing Sheets

(56) References Cited

U.S. PATENT DOCUMENTS

| | | | |
|---|---|---|---|
| 6,406,209 B1 * | 6/2002 | Liu | C23C 14/56 403/13 |
| 6,406,210 B1 * | 6/2002 | Parrish | F16B 5/02 403/12 |
| 6,736,578 B2 * | 5/2004 | McIninch | F16B 5/0208 411/107 |
| 7,083,166 B1 * | 8/2006 | Durfee | B23Q 3/103 269/32 |
| 7,686,553 B2 * | 3/2010 | Durfee, Jr. | F16B 5/0208 248/222.41 |
| 8,033,537 B2 * | 10/2011 | Wuethrich | F16B 5/02 269/289 R |
| 8,740,528 B2 * | 6/2014 | Durfee, Jr. | F16B 5/0208 248/222.41 |
| 2007/0025826 A1 * | 2/2007 | Durfee | F16B 5/0208 411/353 |
| 2010/0260575 A1 * | 10/2010 | Durfee, Jr. | F16B 5/0208 411/107 |

\* cited by examiner

SECTION 8C-8C

PRECISION POSITIONING AND FASTENING SYSTEM

Applicant claims benefit of provisional patent application 60/605,057 filed Aug. 27, 2004. This application is a divisional of U.S. patent application Ser. No. 12/798,126 issued Jun. 3, 2014 as U.S. Pat. No. 8,740,528 which is a divisional of U.S. patent application Ser. No. 11/214,347 issued Mar. 30, 2010 as U.S. Pat. No. 7,686,553 both of which are hereby incorporated by reference.

BACKGROUND AND SUMMARY OF THE INVENTION

The present invention is directed to the field of precision fastening. More particularly, the present invention is directed to a precision locating and fastening system particularly useful in securing work pieces to a work holder for machining operations.

Currently, devices for locating and anchoring articles include dowel pins, a variety of fasteners including shoulder bolts, key ways including T-keys and T-bolts, for example. Dowel pins and other fasteners are adequate for some applications but are not without their limitations. Firstly, when quick connect/disconnect is desired, dowel pins and threaded fasteners typically are found wanting. Dowel pins, for example, require application of axial force and removing the dowels can be time consuming. Typically, dowel pins are used for locating an article and other forms of fasteners are used to secure the item. This use of two different systems mitigates against a quick connect/disconnect.

Shoulder bolts can be used for both locating and fastening. A shoulder bolt is asked to do both the aligning of the attached articles and the fastening/securing of those items. Accordingly, when there is misalignment between the attached article and the base, the threads of the shoulder bolt can bind in the hole. If thread advancement is forced, galling of the holes and stripping of threads can occur. Alternatively, or in addition, damage to the shoulder of the bolt can occur as it is pushed and rotated into the mis-aligned opening.

Keys and key ways are also used for locating and attaching articles to base members. However, such means of locating/attaching can be costly to machine onto both items and certainly, does not provide a form of quick connect/disconnect.

A popular locating and fastening system is the Jergen's Ball Lock mounting system. The ball lock is inserted into the mounting hole until its shoulder engages against the accessory, etc., and then a screw with an angled surface is actuated driving three balls against a complimentary angle in the mating accessory. One of the main problems with this system is that resulting binding can make it difficult to insert and remove this system making its use cumbersome and time consuming.

The locator/fastener system of the present invention overcomes these problems and difficulties. The locating and fastening functions are performed by separate elements of the device with the fastener captured within the locator in a manner enabling it to float, so that the fastener has the freedom to engage the threads in the receiver without binding or galling.

A first aspect of the invention comprises a system for precisely positioning and fastening an article to a base, the system including a locator having a retention head on a trailing end portion, a cylindrical body portion with a leading end portion and a precision-machined external surface adapted to fit within an opening of the article to be precisely located, the locator having an internal axial throughbore. Fastening means is received within the axial throughbore such that an attachment portion extends axially beyond the leading end portion of the locator. Retention means secures the fastening means within the internal axial throughbore; whereby a portion of the cylindrical body portion of the locator extends through the article to be precisely located and is received in a precision-machined internal opening of the base and the attachment portion is securely engaged in the base to retain the article in position relative thereto.

The retention means secures the fastening means within the internal axial throughbore in a manner permitting the fastening means to float relative to the locator. The fastening means is preferably a cap screw and the internal axial throughbore has multiple diameters, a first larger diameter to receive the head of the cap screw and the second to receive the threaded body portion thereof. One preferred drive for the cap screw is an internal hex recess. One form of the retention means comprises a spring clip which engages in a slot formed in the retention head of said locator. It will be understood that other retention means could be used without affecting the operation of the device and the retention means could engage other portions of the fastening means, the projecting portion of the fastener, for example.

The retention head of the locator is preferably formed with an undercut whereby tightening the locator onto the article provides a spring pressure generally equivalent to that provided by a lock washer. The system preferably includes a receiver having external threads for engaging in a tapped recess in the base and has the precision-machined internal opening as a first portion of a stepped axial throughbore, the first portion receiving the precision machined external surface of the locator, a second portion of the stepped axial throughbore receiving the attachment portion of the fastening means. The receiver preferably includes a radially extending head portion surrounding a major axial length of the first portion of the stepped recess, the radially extending head portion cooperating with the retention head of the locator to precisely clamp the article relative to the base. Preferably, the receiver is made of metal which has been treated to harden it.

In a second aspect of the invention, the system for precisely positioning and fastening an article to a base, the article having at least one first throughbore with a first center-line and the base having at least one second throughbore with a second center-line, where the system includes a locator having a cylindrical body portion with a leading end portion and a precision-machined external surface adapted to fit within an opening of the article to be precisely located, the locator having an internal axial throughbore; fastening means; a hardened receiver having an externally threaded cylindrical body, a radially extending head portion and having a precision-machined internal opening as a first portion of a stepped axial throughbore, the precision-machined internal opening receiving at least a portion of the precision-machined external surface of the locator, and a second portion of the stepped axial throughbore receiving and securing a portion of the fastening means. The outer peripheral edge of the leading end portion of the locator has a first angular surface formed thereon and a second complementarily angular surface is formed within a leading internal surface of the receiver, a radial extent of the first and second angular surfaces determining an amount of misalignment between the first center-lines and the second-center lines which can be corrected.

In a third aspect of the invention, the system for precisely positioning and fastening at least one article to a base plate includes a sub-base plate removably attached to the base plate, said sub-base plate having i) at least one throughbore with a first center-line, and, ii) first fastening means by which the at least one article is attached thereto; b) at least one docking stud attached to the sub-base by which the sub-base is proximately positioned relative to and secured to the base plate; a v-shaped docking stud notch for receiving the at least one docking stud and supporting the sub-base; d) second fastening means for engaging attaching the sub-base to the base. Preferably, the fastening means includes at least one locator/fastening means with a precision-machined external surface for engaging in the throughbore in the sub-base plate, the throughbore being a precision-machined throughbore.

Preferably, each locator/fastener means includes a locator having a retention head on a trailing end portion, a cylindrical body portion with a leading end portion and a precision-machined external surface adapted to fit within the precision-machined throughbore in the sub-base, the locator having an internal axial throughbore. Fastening means is received within the axial throughbore such that an attachment portion extends axially beyond the leading end portion of the locator and retention means secures the fastening means within the internal axial throughbore. It is desired that a first angular surface be formed on an outer peripheral edge of the leading end portion of the locator and a second complementarily formed angular surface be formed within a leading internal surface of the receiver, a radial extent of said first and second angular surfaces determining an amount of misalignment between the first center-lines and the second-center lines which can be corrected. The docking stud notch is preferably made of hardened material separate from the base plate and is secured thereto by threaded fasteners.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
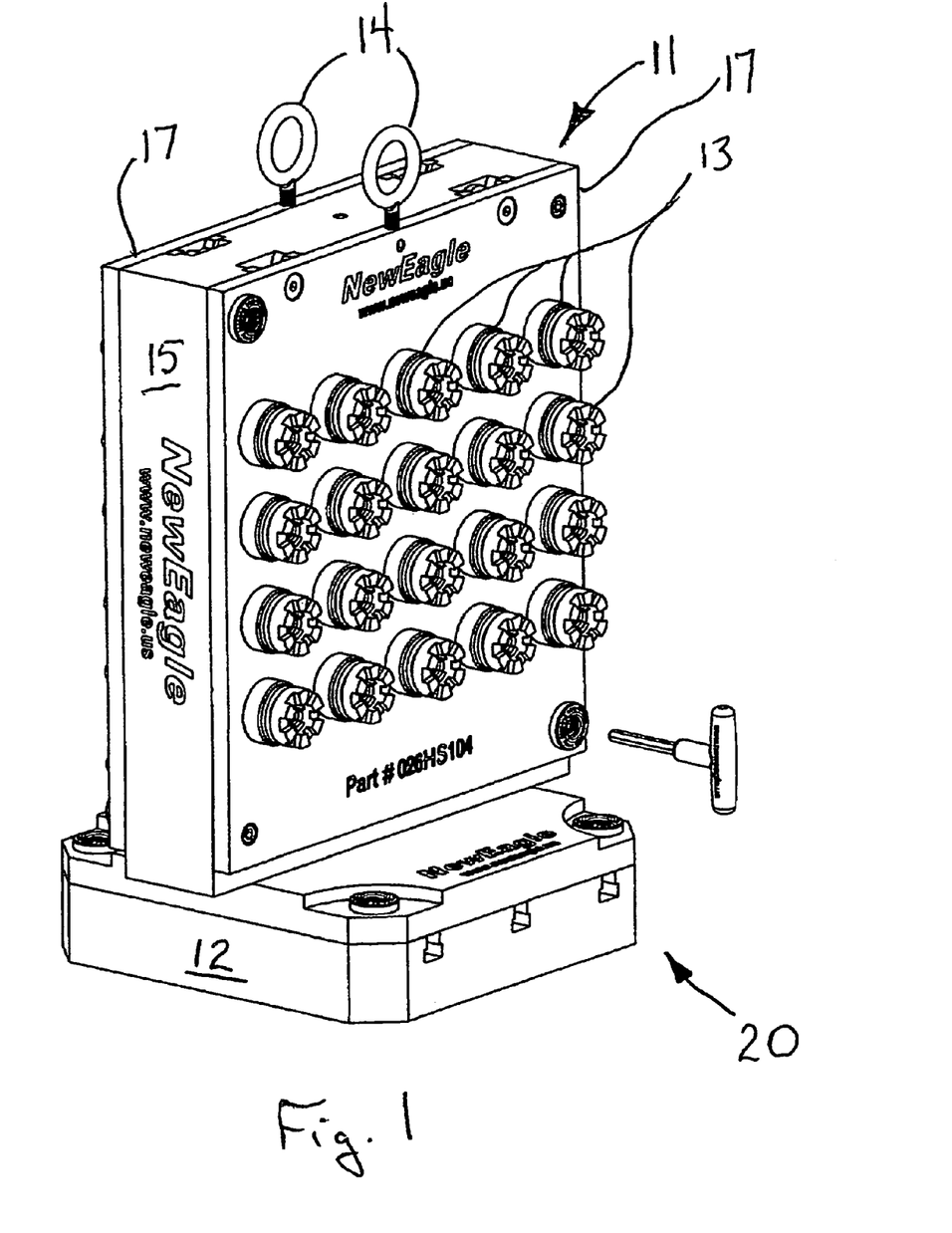
FIG. 1 is a perspective side view of a work holding tombstone employing a first embodiment of the precision positioning and fastening system of the present invention.
Figure 2:
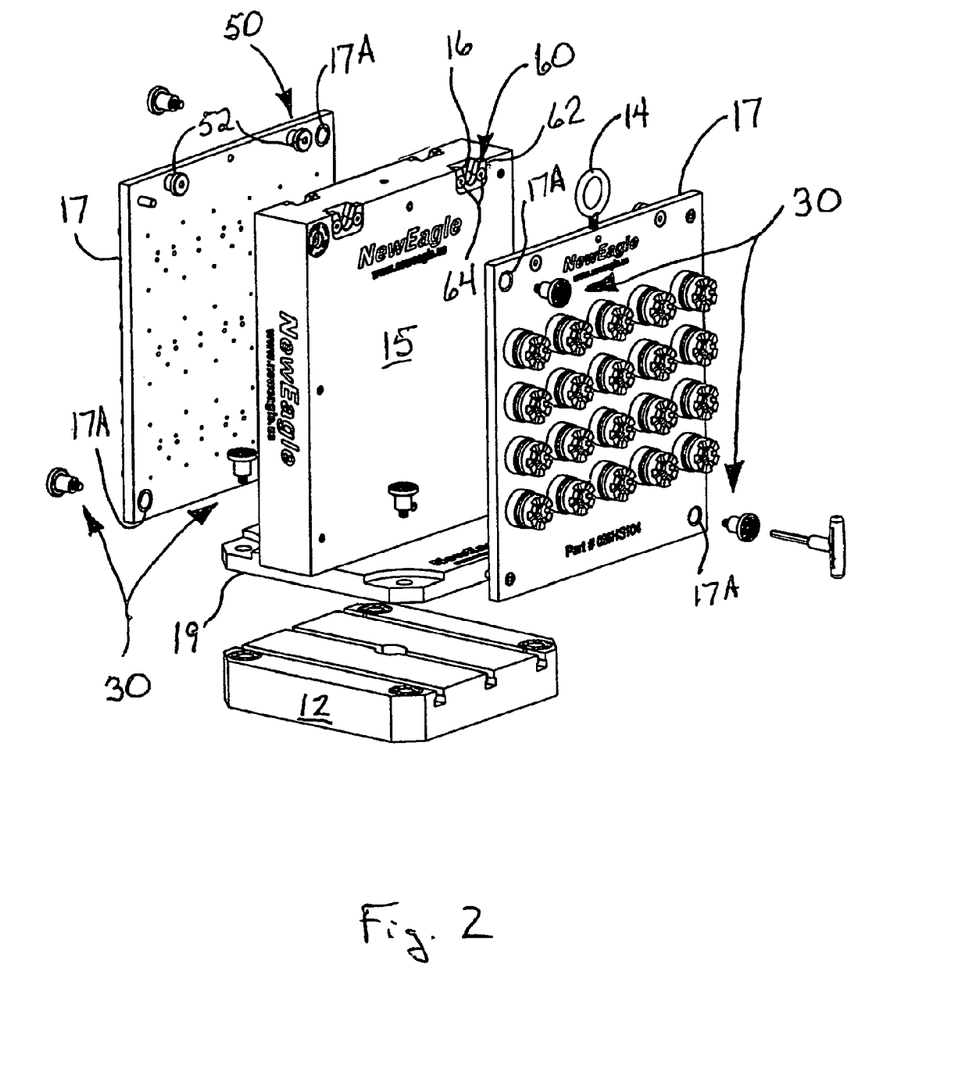
FIG. 2 is an exploded perspective side view of the tombstone of FIG. 1.

A first embodiment of the locating and fastening system of the present invention is depicted in FIGS. 1 and 2 generally at 20. The locating and fastening system 20 of the present invention includes locator/fasteners 30 and a hanger system 50. As depicted in FIGS. 1 and 2, locating and fastening system 20 is used with a workholding chassis or tombstone 11 has secured thereto a number of workpieces 13 for performing machining operations thereon. Tombstone 11 includes a base 15 and two sub-base plates 17 from which workpieces 13 are suspended. Each sub-base plate 17 has a plurality of throughbores with a first set of center-lines 17A. Base 11 has flange 19 extending from either side which is attached to mounting plate 12. Flange 19 can be formed as a separate member and attached to base 11 or may be formed integrally therewith. Eyelets 14 are provided to enable sub-base plates 17 to be lifted and placed upon base 11. Locator/fasteners 30 can be used to fix flange 19 of base 11 to mounting plate 12.

Figure 8A:
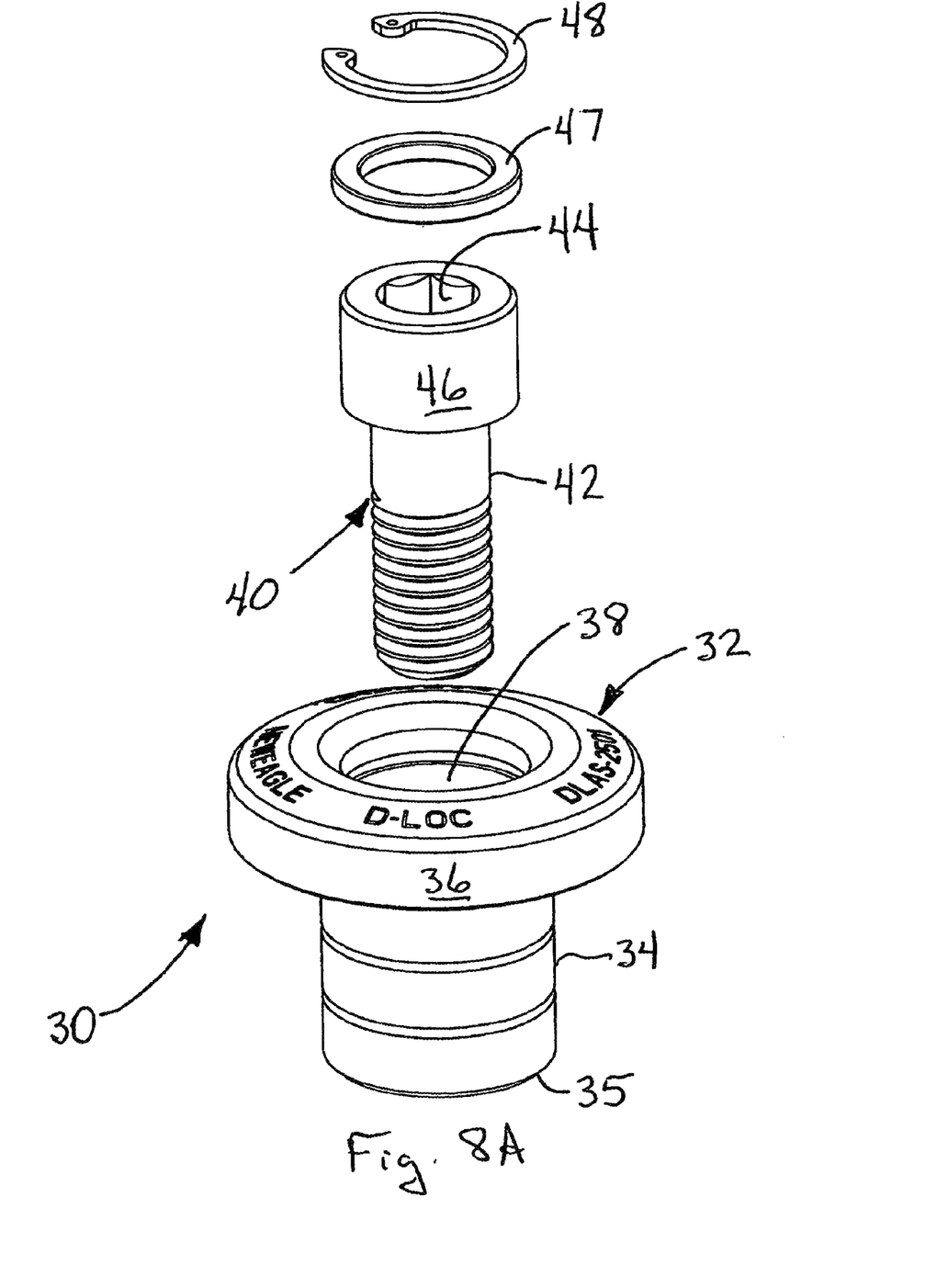
FIG. 8A is an exploded perspective view depicting a first embodiment of the locator/fastener used in the first embodiment of the present invention.
Figures 8B, 8C:
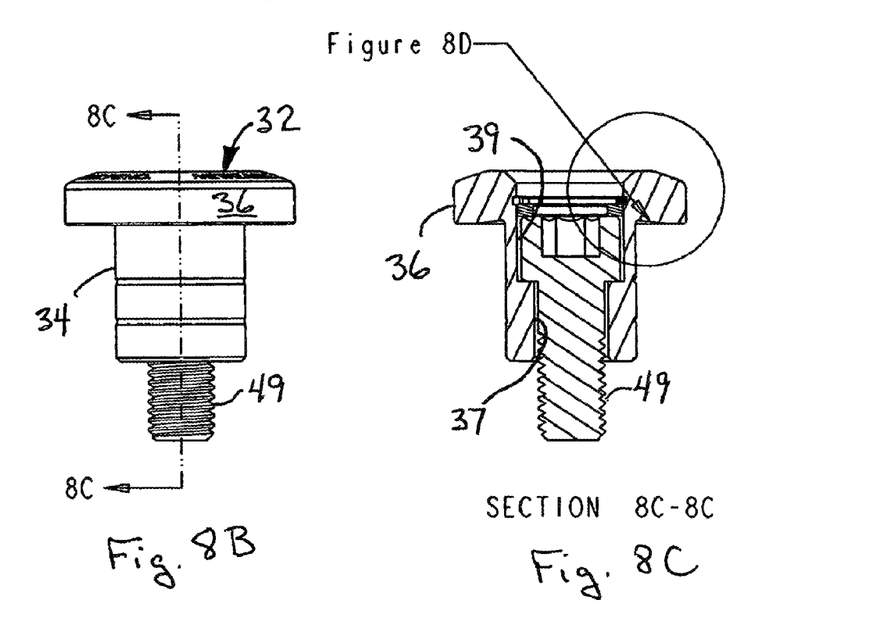
FIG. 8B is an front view of the first embodiment of the locator/fastener.
FIG. 8C is a cross-sectional side view as seen along line 8C-8C in FIG. 8B.

The details of the locator/fastener 30 is shown in FIG. 8A. The locator 32 comprises cylindrical body 34 with a leading end 35, the cylindrical body 34 having a precision-machined outer surface. Retention head 36 is formed on the trailing end portion of locator 32. An axial throughbore 38 extends through the locator. As best seen in FIG. 8C, throughbore 38 preferably has a stepped configuration, a first small diameter 37 receives the shaft 42 of fastener 40. While fastener 40 is depicted here as a cap screw having an internal hex drive 44, it will be appreciated that fastener 40 can take other forms without departing from the scope of the invention. A second larger diameter 39 receives the head of 46 fastener 40.

Figure 8D:
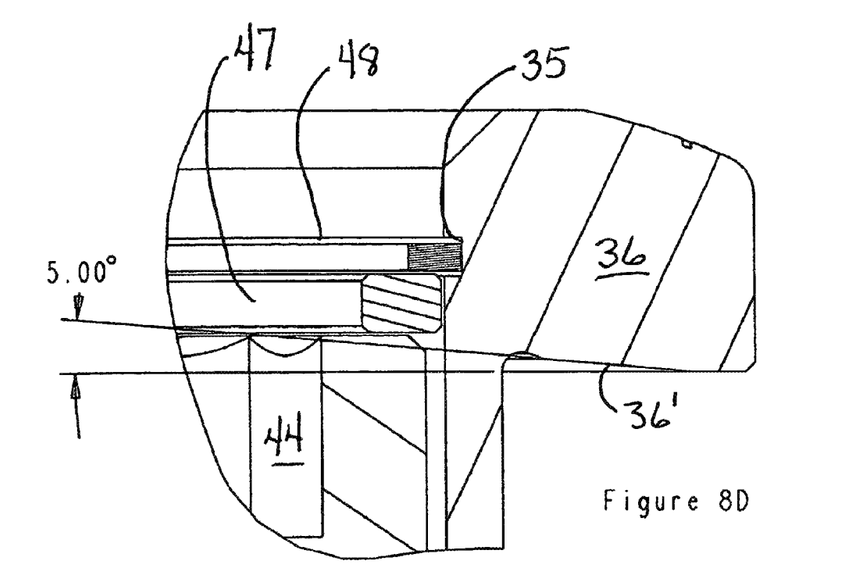
FIG. 8D is an enlarged cross-sectional side view as seen in circle 8D in FIG. 8C.

A washer 47 and spring clip 48 comprise retention means used to secure fastener 40 within locator 32. A slot 33 formed in retention head 36 receives spring clip 48 to secure fastener 40 within the axial throughbore 38. This manner of retaining the fastener 40 within locator 32 enables it to float in throughbore 38 such that the protruding end 49 is free to hunt for the threaded recess it is to engage without binding or galling the threads. It will be understood that other forms of retention means may be employed including, but not limited to, a circlip engaging the protruding end 49 of the fastener 40 below the leading end 35 of locator 32. As best seen in FIG. 8D, retention head 36 on locator 32 is formed with an undercut angle at 36' which is on the order of 5°.

When the fastener 40 is tightened into the threaded receiving hole, retention head 36 flexes functioning as an included lock washer.

Figure 3A:
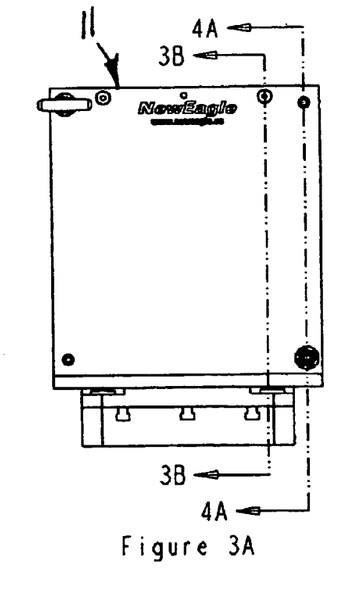
FIG. 3A is a front view of the tombstone shown in FIG. 1.
Figure 3B:
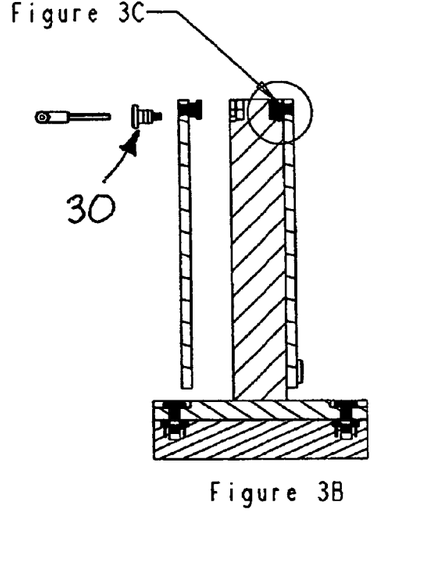
FIG. 3B is a cross-sectional side view of the tombstone shown in FIG. 3A along line 3B-3B with one sub-base removed.
Figure 3C:
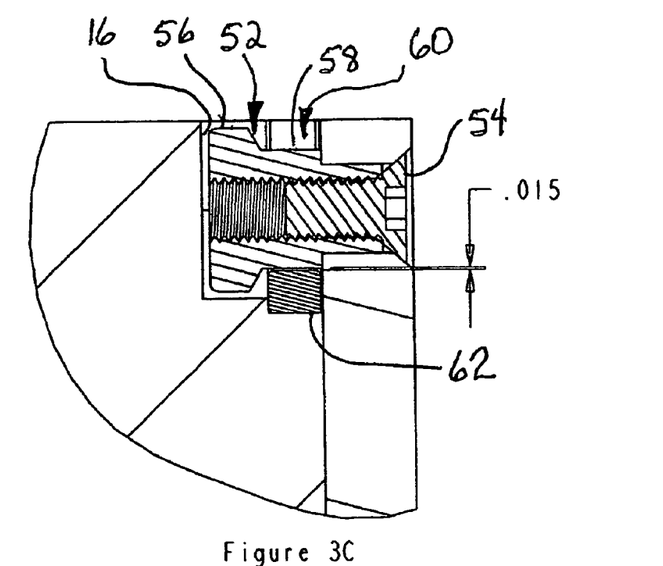
FIG. 3C is a detailed cross-sectional side view as seen in the circle 3C in FIG. 3B.

As seen in FIGS. 2 and 3A-3C, hanger system 50 includes at least one docking stud 52 attached to the sub-base plate 17 by fastener 54. More preferably, for most applications, hangar system 50 will include at least two docking studs 52. Docking stud 52 has an enlarged head 56 and a shoulder 58. Base 15 has formed thereon at least one generally v-shaped docking stud notch 60. While stud notch 60 may be machined into base 15, preferably a separate element 62 with the notch 60 formed therein is attached in a recess 16 machined in base 15 using threaded fasteners 64. In this manner, stud notch 60 can be made of hardened material. As seen in FIG. 3C, the weight of sub-base plate 17 is suspended on the shoulder 58 contacting stud notch 60 in a manner that enlarged head 56 is held out of contact with the recess 16, eliminating the possibility of wearing of the softer material of base 15.

Figure 4A:
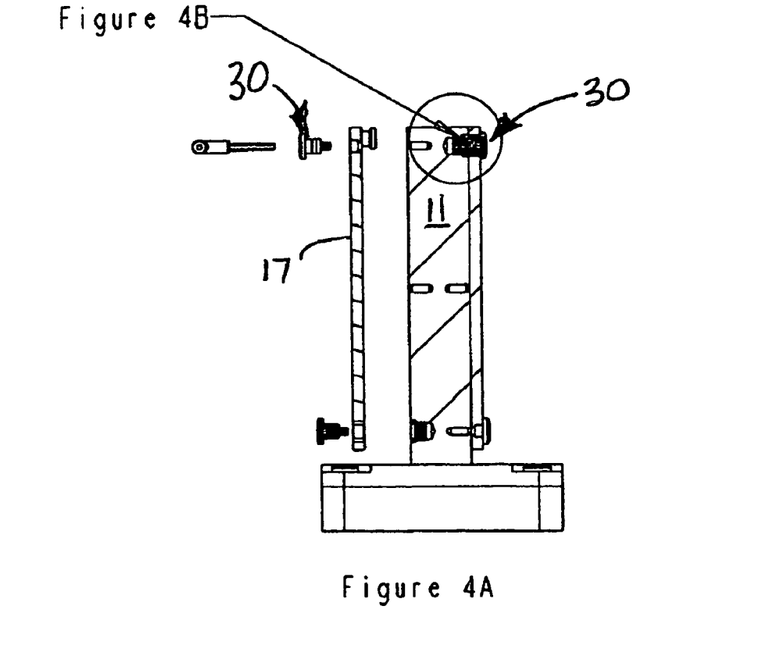
FIG. 4A is a cross-sectional side view as seen along line 4A-4A in FIG. 3A with one sub-base removed.
Figure 4B:
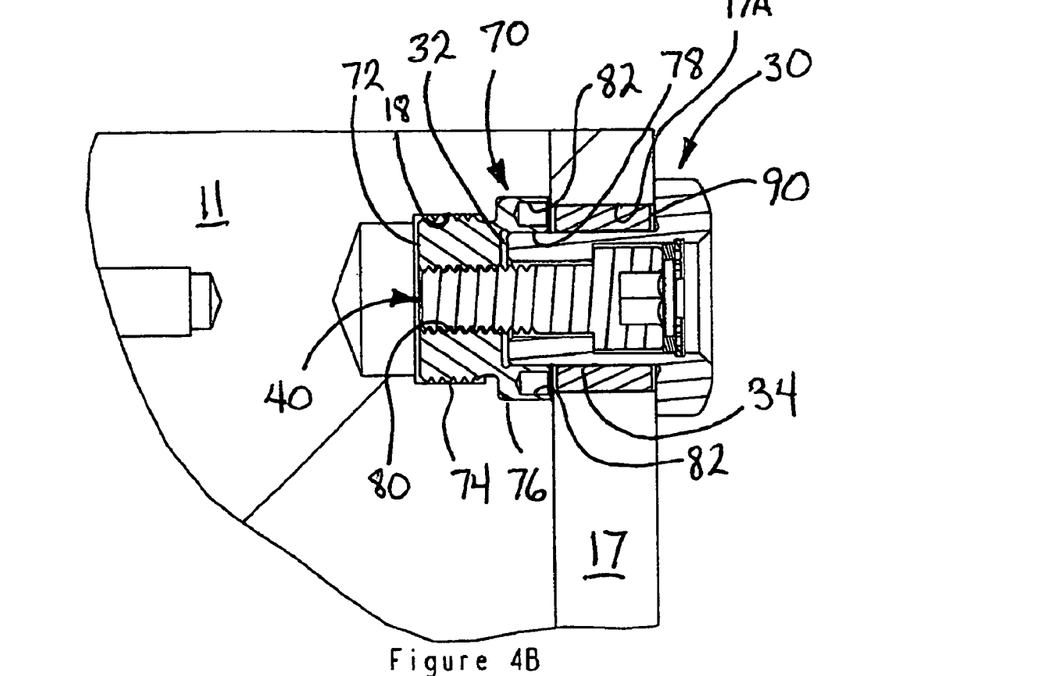
FIG. 4B is a detailed cross-sectional side view as seen in circle 4B in FIG. 4A.

Turning now to FIGS. 4A-4B, locator/fastener 30 will engage in a receiver 70. Receiver 70 can take any of several forms. As shown in FIGS. 4A-4B, receiver 70 has a cylindrical body portion 72 having external threads 74. A radially extending head portion 76 has a precision-machined internal opening 78 as a first portion of a stepped axial throughbore, opening 78 being adapted to receive at least a portion of the precision-machined external surface of body 34 of the locator 32. A second smaller internally threaded diameter 80 receives the threads of fastener 40. Regardless of the embodiment of receiver 70, once installed in base 15, openings 78 have a second set of center-lines. By forming receiver 70 separately from base 15, receiver can be made of harder material, say for example, steel as opposed to aluminum, and can undergo heat treatment such as case hardening, to make it wear longer. A set of drive openings 82 can be formed in the head portion 76 enabling receiver 70 to be tightened into opening 18 in base plate 15. An optional wear bushing 90 can be inserted into the opening 17A in sub-base plate 17 for applications where frequent removal and installation of locator/fastener 30 is anticipated.

Figure 5A:
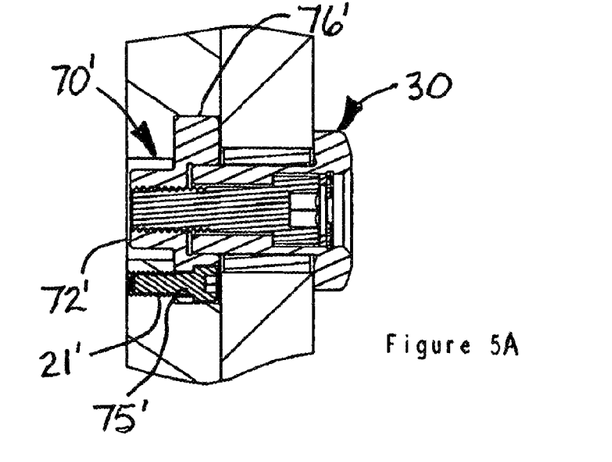
FIG. 5A is a detailed cross-sectional side view as seen in circle 4B showing an second embodiment of receiver.
Figure 5B:
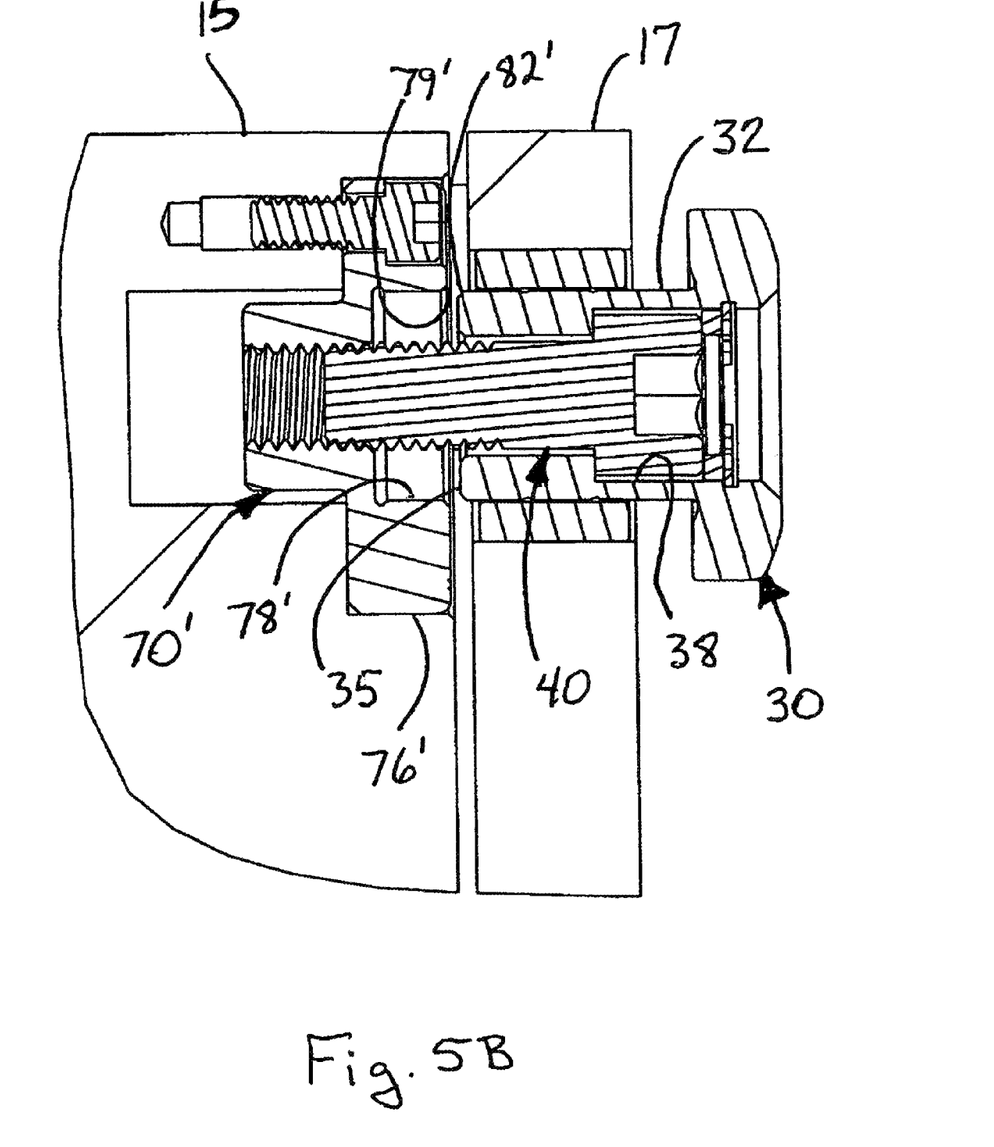
FIG. 5B is a detailed cross-sectional side view with portions partially disassembled.

A second embodiment of receiver is shown in FIGS. 5A, 5B generally at 70'. In this embodiment, rather than having integral threads on cylindrical body portion 72', separate threaded fasteners 21' engage through holes 75' in head portion 76' to secure it in opening in base 11'. FIG. 5B depicts an important feature of each of these receivers and locator fasteners. As seen there, lead end 35 of locator 32 is formed with an angular surface 82'. This angular surface 82' may take the form of a chamfer or radiused surface. A complimentarily shaped surface 79' is formed in the precision-machined opening 78' in head portion 76'. These complementary surfaces enable the locator 32 to adjust for mis-alignment between the base 11 and sub-plate 17 which produces mis-alignment between the receiver 70' and the locator/fastener 30. The combination of these cooperating angular surfaces 79' and 82' and the floating of fastener 40 within the throughbore 38, enable these misalignment difficulties to be overcome.

Figure 6:
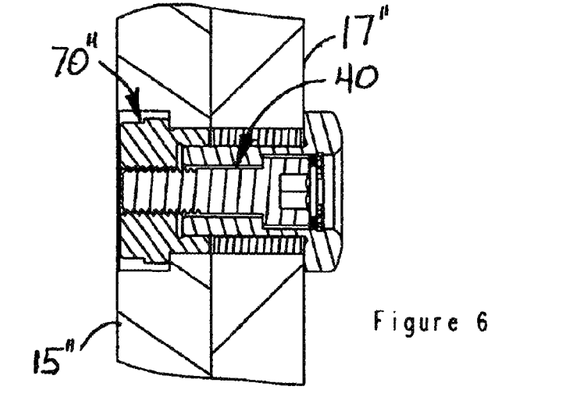
FIG. 6 is a detailed cross-sectional side view as seen in circle 4B showing a third embodiment of receiver.

FIG. 6 shows yet a third embodiment of receiver shown generally at 70". This receiver 70" is installed on the opposite side of base 15" using a press fit. Obviously, body 72" could be threaded or separate fasteners could be employed; however, since fastener 40 will pull the receiver 72" against the rear portion of sub-base plate 17", these additional fastening means are unnecessary.

Figure 7:
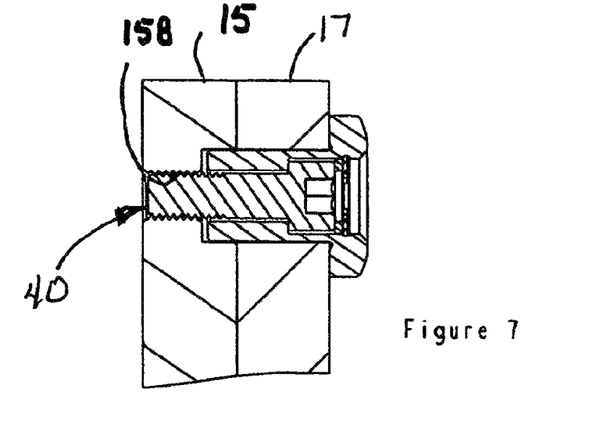
FIG. 7 is a detailed cross-sectional side view as seen in circle 4B showing a fourth embodiment of receiver.

FIG. 7 shows a fourth embodiment where the material of base 15 is sufficiently hard to permit fastener 40 to thread directly into a tapped opening 15B. Since this application uses harder materials, the optional wear bushing in sub-base plate 17 can also be omitted.

Figure 9:
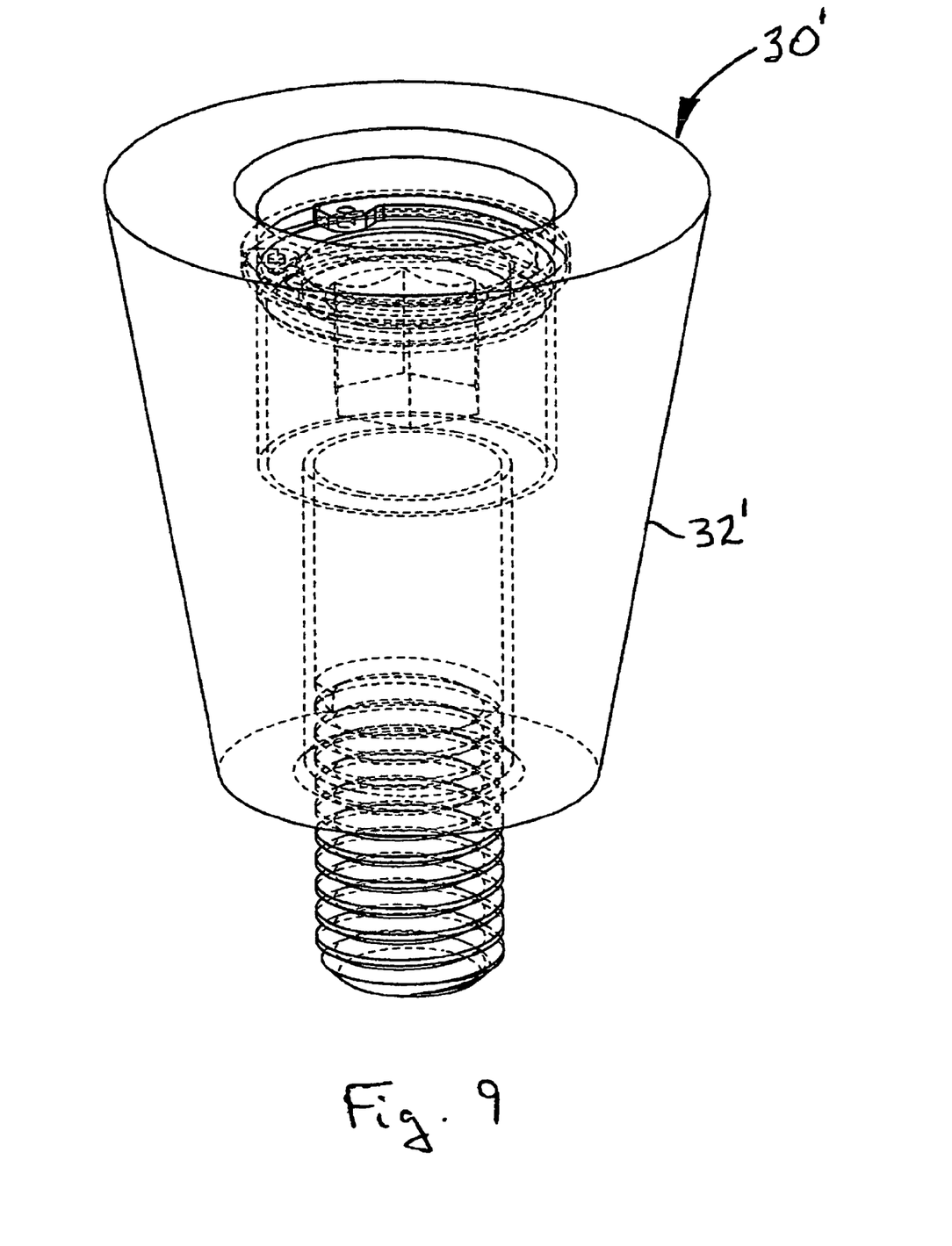
FIG. 9 is an enlarged perspective side view of a second embodiment of locator/fastener used in the first embodiment of the system of the present invention.

FIG. 9 depicts a second embodiment of locator/fastener 30'. In this embodiment, the external surface of locator 32' is formed as a frusto-conical member. Such a configuration will accommodate a significantly larger amount of mis-alignment than the first, preferred embodiment.

Figure 10A:
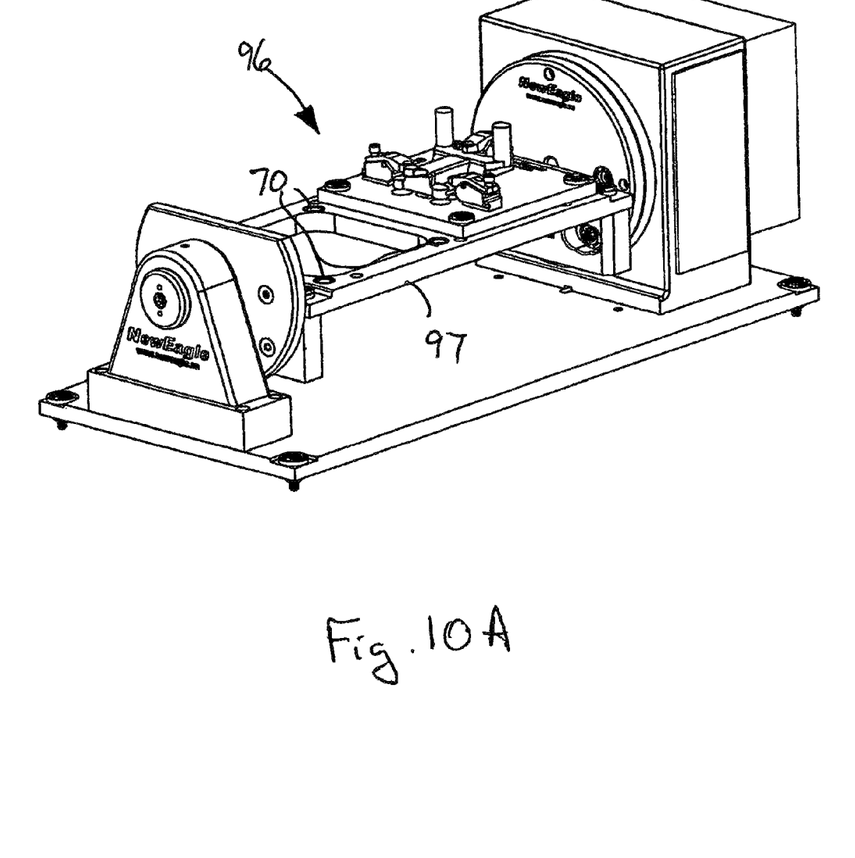
FIG. 10A is a perspective view of an industrial application of the locator/fastener of the present invention; and, FIG. 10B is an exploded perspective view of the industrial application shown in FIG. 10A.
Figure 10B:
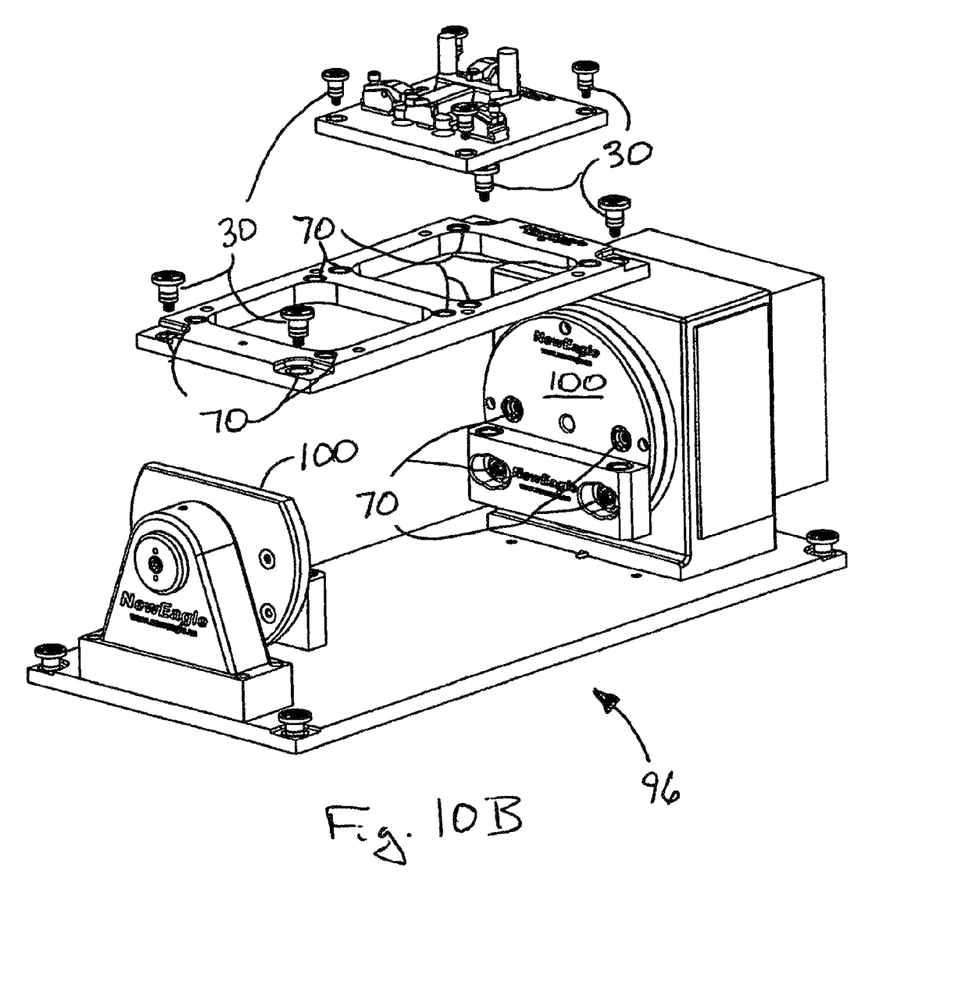

FIGS. 10A and 10B depict an alternate industrial application for the locator/fastener system of the present invention. The device 96 depicted there is fourth-axis trunnion fixture for machine operations performed on a vertical milling machine, for example. Sub-base plate 97 has a plurality of receivers 70 therein. Fixture plate 98 is secured using locator/fasteners 30. Other locator/fasteners 30 attach sub-base plate 97 to brackets 99 and brackets 99 to face plates 100. The use of the precision locating and fastening system 20 enable fixture plate 98 to be quickly and easily removed and adjustments in center-line height of the sub-base plate 97.

In utilizing the precision fastening and locating system 20 of the present invention, the hangars 50 will typically be attached to base 11 and sub-base plate 17 in a manner such that the first set of center-lines of throughbores 17A will be located on the order of 0.015 inch below the second centerlines of throughbores 78 in receivers 70. The floating of fastener 40 in locator 32 enables the protruding end 49 to hunt for the threads 80 in receiver 70 without binding or galling. As the angular surface 82' engages complimentary surface 79', precision-machined exterior of body 35 tracks into precision machined internal surface 78' and lifts sub-base 17 the 0.015 inch to bring the first center-lines of 17A into alignment with the second center-lines of throughbores 78 as fastener 40 narrows the gap between retention head 36 and head portion 76', eventually gripping sub-base plate 17 therebetween.

Various changes, alternatives and modifications will become apparent to one of ordinary skill in the art following a reading of the foregoing specification. For example, while the locator/fastener system has been disclosed for use with, and is particularly well suited for, workpiece fixtures, the system can be employed anywhere two items are to be fastened together. It is intended that any such changes, alternatives and modifications as fall within the scope of the appended claims be considered part of the present invention.

I claim:

1. A method of precisely positioning and fastening at least one article in a fixed position on a baseplate, said method comprising the steps of
    a) securing said at least one article to a sub-base plate, said sub-base plate having
        i) at least one throughbore with a first center-line, and,
        ii) first fastening means for securing the at least one article to said subbase plate;
    b) removably attaching said sub-base plate to a base using at least one docking stud attached to said sub-base plate by which the first centerline of the throughbore in said sub-base plate is positioned on the order of 0.015 inches below a second centerline of a throughbore in said base plate, whereby said at least one docking stud supports a weight of the sub-base plate;
    c) providing a base plate having at least one generally v-shaped docking stud notch having an open upper side receiving said at least one docking stud and supporting the weight of said sub-base;
    d) inserting second fastening means for engaging and attaching said sub-base to said base plate, said second fastening means having a hunting capability which permits it to lift said sub-base plate relative to said base plate to bring said first centerline into alignment with said second centerline.

2. The method of claim 1 wherein said inserting step is further characterized by said second fastening means including at least one locator and fastening means for precisely positioning and retaining the article in place, said locator and fastening means having a precision-machined external surface for engaging in said throughbore in said sub-base plate, said throughbore in said sub-base plate being a precision machined throughbore.

3. The method of claim 2 wherein a plurality of locator and fastener means are provided to retain said sub-base plate to said base, each locator and fastener means comprises
   a) a locator having a retention head on a trailing end portion, a cylindrical body portion with a leading end portion and a precision-machined external surface adapted to fit within said precision-machined throughbore in said sub-base plate, said locator having an unthreaded internal axial throughbore;
   b) fastening means for securing the article to the base plate which is received within said axial throughbore in said locator such that an externally threaded attachment portion extends axially beyond said leading end portion of said locator;
   c) removable retention means for securing said fastening means within said internal axial throughbore of said locator against undesired removal therefrom.

* * * * *